United States Patent [19]

Huang et al.

[11] Patent Number: 5,086,619
[45] Date of Patent: Feb. 11, 1992

[54] FILLER APPARATUS FOR PROVIDING CRYOGENIC LIQUID COOLANT TO DEWARS SUCH AS THOSE USED IN RADIATION DETECTORS

[75] Inventors: Yuchi Huang, Madison; Charles Talbot, Belleville; Jeffrey R. Henderson, Madison, all of Wis.

[73] Assignee: Nicolet Instrument Corporation, Madison, Wis.

[21] Appl. No.: 538,995

[22] Filed: Jun. 15, 1990

[51] Int. Cl.⁵ .............................................. F17C 7/02
[52] U.S. Cl. ..................................... 62/50.1; 62/51.1; 141/340; 250/352
[58] Field of Search ................ 141/340, 341; 250/352; 62/45.1, 50.1, 51.1

[56] References Cited

U.S. PATENT DOCUMENTS

| | | | |
|---|---|---|---|
| 3,059,114 | 10/1962 | Haettinger et al. | 250/352 |
| 3,258,602 | 6/1966 | Promish | 250/352 |
| 3,364,688 | 1/1968 | Matlow et al. | 62/45.1 |
| 3,425,234 | 2/1969 | Trepaud | 62/45.1 |
| 3,605,424 | 9/1971 | Paine | 62/50.1 |
| 4,273,166 | 6/1981 | Bradley | 141/340 |
| 4,495,782 | 1/1985 | Salour et al. | 250/352 |
| 4,715,187 | 12/1987 | Stearns | 62/50.1 |
| 4,740,702 | 4/1988 | Huang et al. | 62/514 R |
| 4,773,228 | 9/1988 | Murai et al. | 62/51.1 |

*Primary Examiner*—Ronald C. Capossela
*Attorney, Agent, or Firm*—Foley & Lardner

[57] ABSTRACT

A filler apparatus for cryogenic dewars, such as are used in infrared detectors in infrared spectrometers, has an inlet port funnel which is connected to a liquid delivery tube which extends downwardly and into the liquid coolant containment vessel of the detector. A gas discharge tube extends co-axially with and spaced outwardly from the delivery tube and is connected to the fill port of the detector to direct gas resulting from evaporation of coolant within the detector up to a gas outlet funnel which is itself co-axial with and spaced outwardly from the inlet port funnel. A screen is mounted over the tops of the inlet and outlet funnels. The coolant, such as liquid nitrogen, is poured by the operator into the inlet funnel, which may be located at a position on the top surface of the cabinet of the spectrometer, and the operator can observe whether the detector is overfilled by noting whether the coolant liquid overflows into the gas discharge tube or up into the space between the inlet and outlet funnels. Because gas resulting from evaporation is directed upwardly and discharged through a space which is separated from the liquid delivery tube, backflowing of the liquid coolant in the delivery tube and funnel is minimized. By allowing the operator to introduce the liquid coolant to an inlet port at the top of the spectrometer cabinet, filling of the detector is simplified.

26 Claims, 4 Drawing Sheets

FILLER APPARATUS FOR PROVIDING CRYOGENIC LIQUID COOLANT TO DEWARS SUCH AS THOSE USED IN RADIATION DETECTORS

FIELD OF THE INVENTION

This invention pertains generally to the field of cryogenically cooled instruments such as infrared radiation detectors that are cooled by liquid nitrogen of the type commonly used in Fourier transform infrared (FTIR) spectrometers.

BACKGROUND OF THE INVENTION

Infrared radiation detectors convert infrared energy into an electrical signal that can be measured to allow quantification of the amount of infrared radiation received by the detector. One example of the use of such detectors is in the field of infrared spectroscopy, such as Fourier transform infrared (FTIR) spectroscopy. In an FTIR spectrometer a beam of infrared radiation passes through an interferometer, typically a Michelson moving mirror interferometer, and then is transmitted through or reflected from a sample before being detected by the detector. The interferometer can be used to generate a spectrum of the original infrared beam unimpeded by a sample and then a second spectrum with the sample placed in the beam. The difference between the original spectrum and the spectrum obtained with the sample in the beam provides information that can be used to compute the infrared spectral response of the sample.

Certain types of infrared detectors used in FTIR spectrometers are cooled with liquid nitrogen to maintain the detector at a constant low temperature to minimize the effect of thermal noise. Mercury cadmium telluride (MCT) detectors are a particular example of sensitive FTIR detectors which are cooled with liquid nitrogen. Cooling of the detector yields particular advantages for infrared analyses, such as spectroscopy, because it improves the signal to noise ratio in the measured electrical signal from the detector and thereby gives greater sensitivity and/or improves spectral resolution.

One type of infrared detector assembly which utilizes cooling with liquid nitrogen is shown in U.S. Pat. No. 4,740,702, the disclosure of which is incorporated herein by reference. This type of detector uses a dewar structure in which there is an inner vessel which contains the liquid nitrogen and which is thermally connected to the detector and an outer vessel which is spaced from and surrounds the inner vessel to provide a space between them which yields thermal isolation of the liquid nitrogen in the inner vessel from ambient atmospheric temperatures.

Detector assemblies and other instruments having dewars that use liquid nitrogen or other liquified gas coolants must be refilled with the cryogenic coolant periodically to replace liquid coolant that has evaporated. In U.S. Pat. No. 4,740,702, a fill port at the top of the assembly provides access to the interior of the liquid nitrogen containment vessel within the dewar. The fill port typically is a small hole on the top surface of the dewar.

In existing designs for FTIR spectrometers, the infrared detector assembly is often positioned deep within the optical section of the instrument. The limited accessibility of this location creates problems when the dewar must be refilled. If the dewar is buried deep within the optical section, access may be extremely limited even with the spectrometer cabinet removed. In addition, there may be drive motors and other mechanical components which actuate the optical elements which may interfere with access to the dewar.

Another problem which can be encountered when the dewar is being refilled is overflow of nitrogen or other cryogenic coolant from the dewar. Not only must the operator be able to pour nitrogen into the dewar, he or she must also be able to determine when the dewar is full, so that liquid nitrogen does not overflow and spill inside the spectrometer. Such spills should be avoided because they can disturb experiments in progress and cause thermal shock that can destroy electronic components. Metal dewars can complicate the task of refilling because the operator may be unable to see adequately inside the fill port to determine when the coolant is about to overflow. Another problem encountered is flow reversals or backflows of the liquid nitrogen. As liquid nitrogen evaporates, the gas at atmospheric pressure occupies about 650 times the space of the corresponding liquified nitrogen. Many dewar designs have a relatively small fill port, and if the operator attempts to pour liquid nitrogen into the fill port too quickly, the nitrogen evaporating inside the dewar may create enough back pressure to reverse the flow of liquid nitrogen being poured in. In such cases, liquid nitrogen can spew out of the fill port. Thus, it is desirable to provide an easy escape for the large volume of nitrogen gas that evaporates inside the containment vessel in the dewar.

SUMMARY OF THE INVENTION

In accordance with the present invention, filler apparatus for providing cryogenic coolant to a dewar such as that utilized in an infrared detector has concentric tubes which extend from an operator access area to the fill port of the dewar. The inner tube acts as the liquid delivery tube and extends from an inlet port to the interior of the coolant containment vessel of the dewar. The outer tube or gas discharge tube is concentric with the inner liquid delivery tube and extends from the fill port of the dewar, where it is sealed to the top of the dewar so that evaporating gas from the dewar can only enter the discharge tube, to an outlet port at a position remote from the dewar, preferably at the top of the cabinet of the spectrometer. The liquid delivery tube has a relatively narrow diameter which serves to meter the flow of liquid coolant into the dewar, while the area between the outside of the delivery tube and the inside of the concentric gas discharge tube is relatively large, allowing free escape of evaporated coolant gas through the discharge tube up to the outlet. The outer gas discharge tube is preferably formed of a relatively transparent plastic so that the operator can observe the tube at a position near to the top of the dewar to determine when the dewar is filled and liquid begins to fill up into the gas discharge tube.

The liquid inlet port is preferably formed as a funnel of conic shape with a relatively wide open top which narrows down to the diameter of the delivery tube. The gas outlet port is preferably formed also as a conically shaped funnel which is concentric with and surrounds the inlet funnel and which narrows down from a relatively wide open top to the diameter of the gas discharge tube where it is joined with the discharge tube. A screen may be utilized to cover both the liquid inlet and the gas outlet ports, spanning across the top openings of both funnels, to minimize the likelihood of foreign objects falling into the port. A cover is preferably provided which closes down to cover both ports. The relatively wide top inlet funnel allows the operator to easily pour the liquid coolant into the inlet port. The surrounding outlet port funnel has the particular advantage that the horizontal area of the outlet port increases constantly from the point at which the outlet funnel is joined to the discharge tube to the open top of the funnel. Thus, if excess liquid coolant is poured into the inlet port and fills not only the dewar but also the entire discharge tube, as it reaches the funnel shaped outlet port the rate at which the vertical level of the liquid coolant will rise in the funnel will slow down for a constant rate of pouring of coolant into the inlet funnel, thus reducing the likelihood that the liquid coolant will accidently overflow. In addition, the operator will readily see that coolant has overflowed as coolant accumulates in the inlet port funnel and does not drain down. An additional cue to the operator that the coolant has risen up in the tubes or is beginning to fill the funnels is that the pitch of the sound that the operator hears as he pours will change. With practice, operators can often tell when to stop pouring by the pitch change alone.

A particular advantage of the concentric delivery and discharge tubes is that evaporating coolant gas in the discharge tube will surround the coolant, e.g., liquid nitrogen, being passed through the delivery tube, thus tending to shield this liquid nitrogen from the relatively higher temperatures of the surrounding ambient atmosphere, reducing the warming of the liquid nitrogen as it flows through the delivery tube. With less warming of the incoming liquid coolant, such as liquid nitrogen, there is less vaporization of the liquid coolant in the delivery tube and less possibility of backflow in this tube. Thus, the present invention allows the dewar to be filled easily and readily by the operator at a port located at a position remote from the dewar, such as on the top of the spectrometer cabinet, eliminating the need for operator access to the dewar deep within the cabinet, while nonetheless allowing the coolant to be supplied to the dewar efficiently and with very little additional loss of coolant beyond that which would occur if the dewar were filled directly at its fill Port by the operator. In addition, spills and backflows of liquid coolant are minimized.

Further objects, features, and advantages of the invention will be apparent from the following detailed description when taken in conjunction with the accompanying drawings.

DETAILED DESCRIPTION OF THE INVENTION

Figure 1:
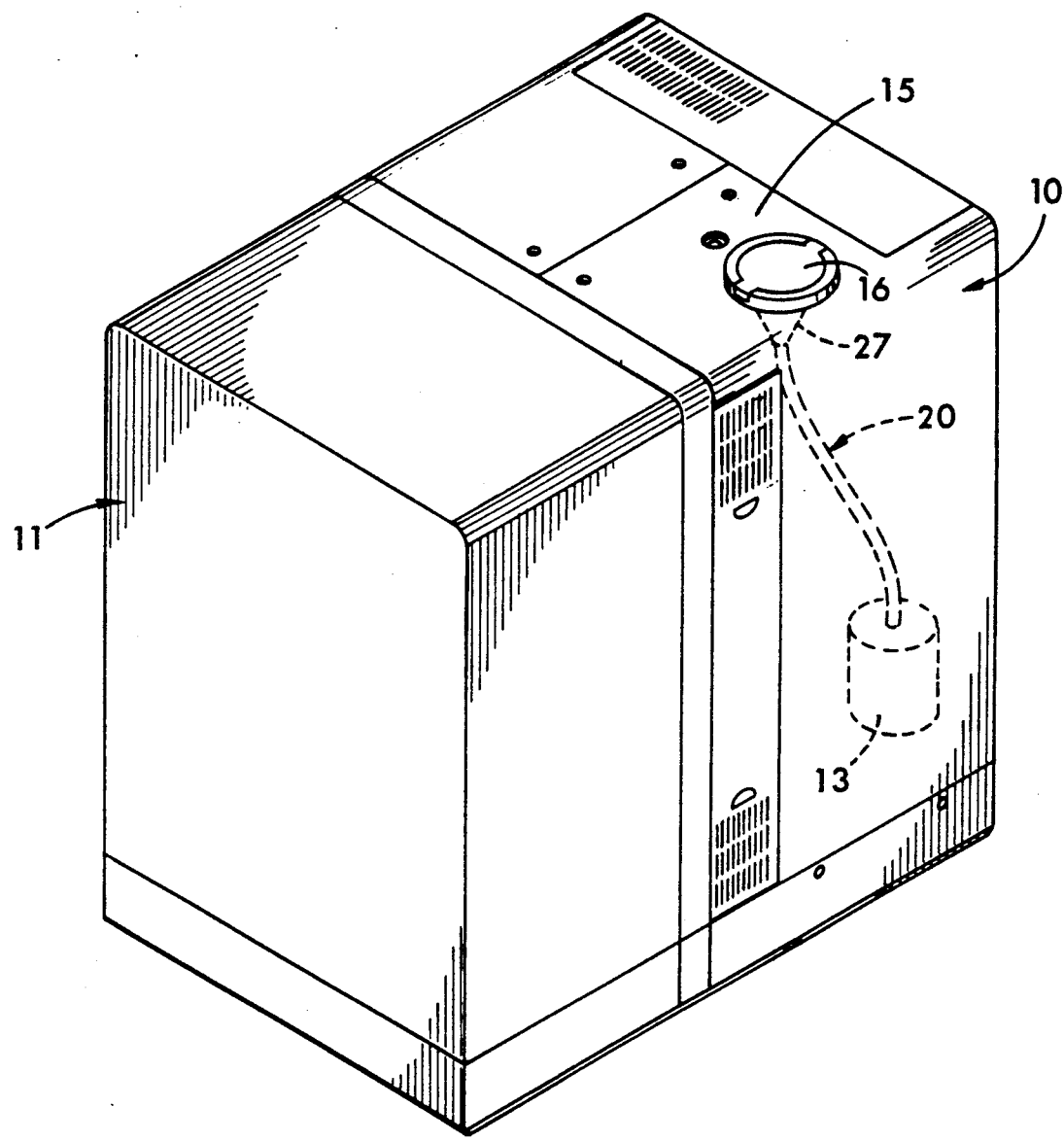
FIG. 1 is a perspective exterior view of an exemplary instrument cabinet showing the positioning of the detector dewar and the cover over the coolant filling port.

With reference to the drawings, an exemplary instrument cabinet is shown at 10 in FIG. 1 which may contain an infrared spectrometer connected to, for example, a microscope assembly or other sample analyzing unit shown illustratively as the block 11 in FIG. 1. The optical elements of the instrument are enclosed within the cabinet 10, and include an infrared detector assembly 13 shown in dashed lines in FIG. 1. The arrangement shown in FIG. 1 is understood to be for illustrative purposes only, and many other arrangements for mounting the detector within a cabinet and providing access to it are known and may be utilized. A filler cover 16 is provided which covers an opening in the top surface 15 of the cabinet. In accordance with the present invention, the cover 16 can be opened by the operator to expose an inlet port into which liquid coolant for the detector 13, such as liquid nitrogen, may be poured. In contrast to typical prior spectrometer systems which required that the operator deliver the liquid coolant to the detector 13 by accessing the detector through a detector access door or by removing the instrument cabinet 10, and delivering the liquid coolant to a fill port at the top of the detector, the operator can easily and readily provide the liquid coolant to the detector by simply opening the cover 16 and pouring the coolant into the port at the top of the spectrometer. The ready accessibility of the inlet port greatly simplifies the operator's job in providing liquid coolant to the detector.

Figure 2:
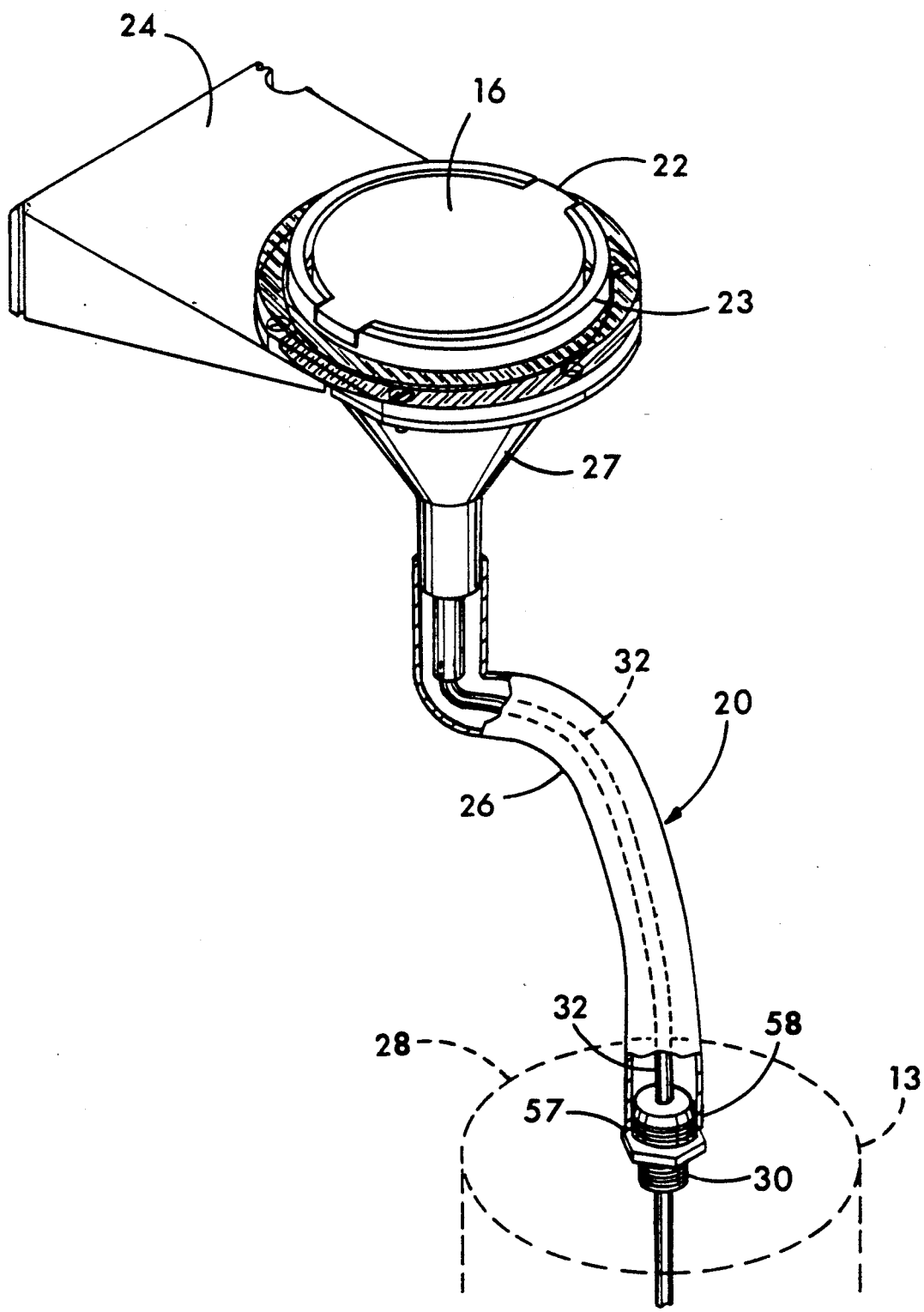
FIG. 2 is a perspective view of the filler apparatus for remote filling of a dewar in accordance with the present invention.

The remote filler apparatus of the invention is shown generally at 20 in FIG. 2 in a perspective view with the cabinet 10 of the spectrometer removed. As shown in FIG. 2, the cover 16 is hingedly mounted at a hinge 22 to a collar 23 which is itself mounted on a bracket 24 which is attached to the cabinet of the spectrometer (not shown in FIG. 2). The cover 16 spans and covers both a liquid coolant inlet port and a gas outlet port. As shown in the external view of FIG. 2, a gas discharge tube 26 extends from a funnel 27, preferably conical, which forms part of the gas outlet port, to the top of the detector apparatus 13. The detector 13 is preferably a dewar type detector which has an outer vessel 28 which encloses an inner vessel (not shown in FIG. 2) which contains the liquid coolant, such as liquid nitrogen. The tube 26 is connected to the fill port 30 at the top of the detector 13 and is in communication with the interior of the inner vessel within the detector. A preferred exemplary detector 13 is shown in U.S. Pat. No. 4,740,702 entitled "Cryogenically Cooled Radiation Detection Apparatus", the disclosure of which is incorporated herein by reference. A second, smaller diameter liquid delivery tube 32 (shown in dashed lines in FIGS. 2 and 3), within and coaxial with the gas discharge tube, extends from the inlet port into the interior of the inner vessel of the detector apparatus 13. It is through this liquid delivery tube that the liquid coolant is supplied from the inlet to the dewar.

Figure 3:
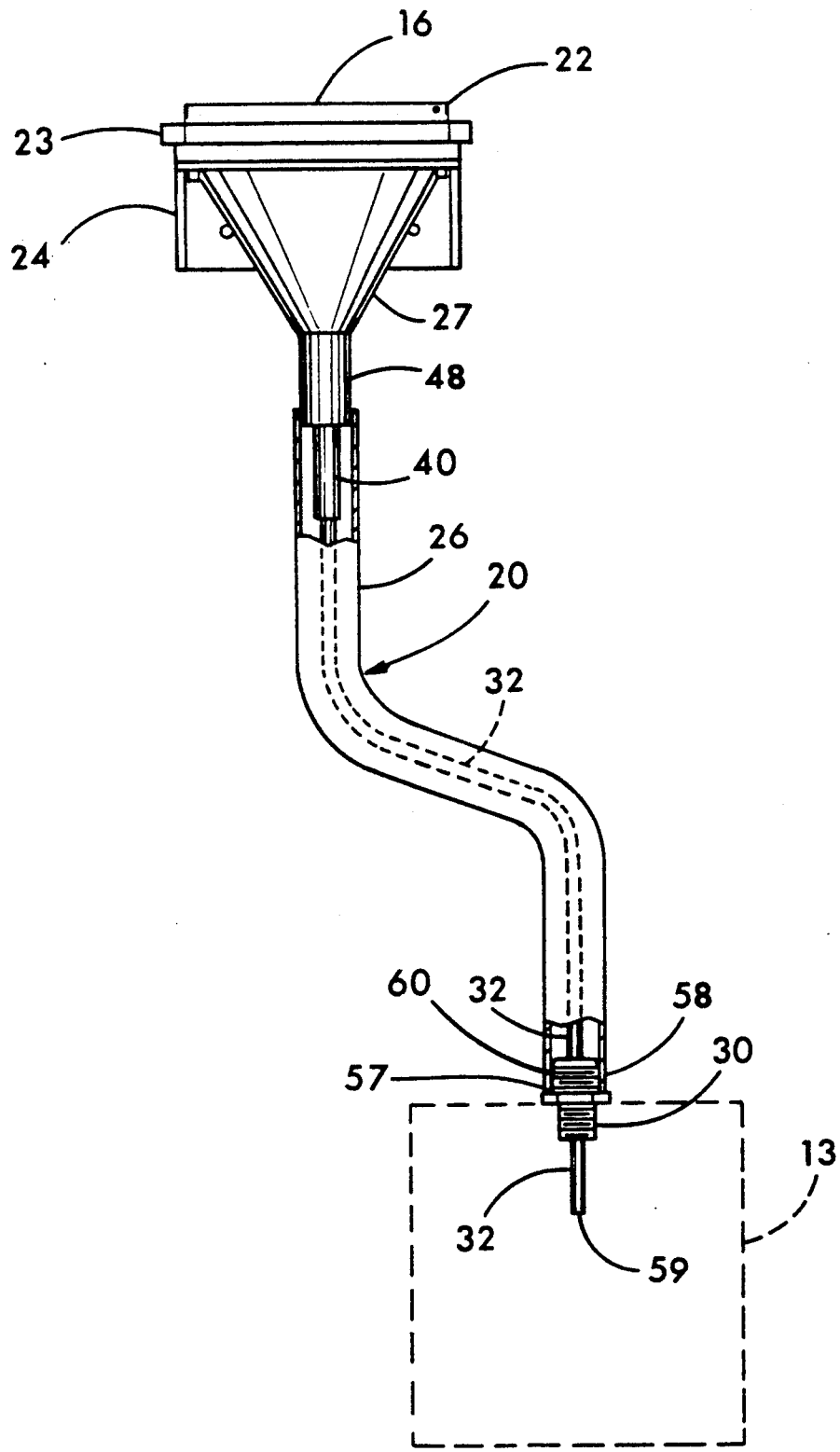
FIG. 3 is an elevational view of the dewar filler apparatus of FIG. 2.

The tubes 26 and 32 may have a bend as shown in FIGS. 2 and 3 to accommodate the location of the detector 13. The tubes 26 and 32 may be made of any suitable material, although it is preferred that the outer tube 26 be formed of a relatively transparent, durable and thermal stable plastic material such as nylon or polytetrafluoroethylene (PTFE) such as that sold under the trademark TEFLON. The critical issue for the tubes is durability and temperature stability. Many materials, particularly some plastics, will crack or crystallize at the low temperatures of liquid nitrogen. Polytetrafluoroethylene is the preferred material because it will not crack under low temperatures as will some other materials. PTFE also is relatively flexible, but its durability and temperature stability are more important than its flexibility qualities. As long as the material can be formed to the desired shape (whether rigid or flexible) and it holds up to the liquid nitrogen and does not contaminate the interior of the spectrometer, substantially any material can be used for the tubes. Of course, flexible tubes are generally easier to route.

Figure 4:
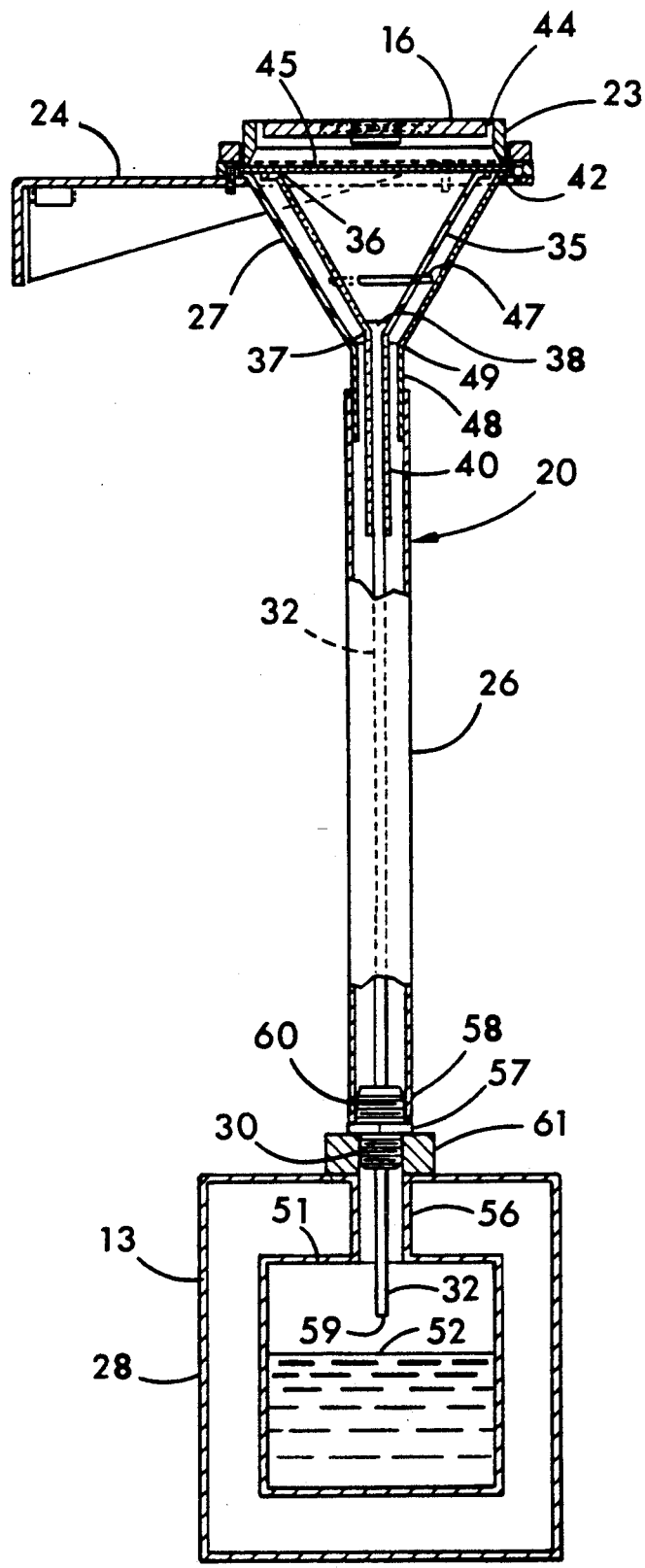
FIG. 4 is another view, partially in cross section, of the dewar filler apparatus of the present invention.

The construction of the dewar filler apparatus 20 is best shown with respect to the partial cross-sectional view of FIG. 4. As shown therein, the coolant liquid inlet port includes a funnel 35, preferably conical, having a top opening 36 of maximum width which narrows down to a bottom 37 at which it is joined to the liquid delivery tube 32. The funnel 35 includes an extension portion 40 which has a hollow interior bore. The top of the delivery tube 32 is flared (shown in FIG. 4) and is inserted down through the funnel 35 until the flare 38 rests at the bottom 37 of the funnel 35. This flared connection is a preferred construction since it has been found that adhesives will generally not work to seal the delivery tube 32 to the funnel 35 and thereby prevent leaks. Few adhesives will adhere to the PTFE delivery tube 32 and many of those adhesives will crystallize and fail at the low temperature of liquid coolant. In another preferred embodiment, not shown, the delivery tube 32 and the funnel 35 may be integrally formed as a single unit. Other embodiments may also be used so long as they prevent the liquid coolant from leaking. The top opening of the funnel 27, which defines the gas discharge outlet, has a wide outer periphery 42 which is spaced coaxially and outwardly from the top opening 36 of the funnel 35 defining the coolant inlet port. Coolant gas, such as nitrogen, evaporating from the dewar passes up through the outlet defined between the top opening 36 and the peripheral top opening 42 to vent the gas. As shown in FIG. 4, the cover 16, when in its closed position, spans across the inlet port and the outlet port but has a peripheral edge 44 which is spaced slightly inwardly from the inner edge of the collar 23 to define an opening through which evaporating coolant gas can escape. A filter screen 45, which may be formed of a polyethylene mesh, may be mounted across the top openings of the inlet port and outlet port as shown in FIG. 4. The screen 45 allows the liquid coolant to be readily poured therethrough, and allows evaporating gas to pass upwardly therefrom through the outlet port. The screen to impede the ingress of any foreign objects that might be accidently dropped by the operator while the cover 16 is open. In the preferred embodiment, the screen may also press down slightly on the tops of the funnels to help keep them in position. This helps to keep the funnels centered and helps keep the space between the funnels open to the escape of evaporating cooling gas. A perforated spacer 47 is mounted between the funnel 35 and the funnel 27 to maintain the spacing between them while allowing gas to flow freely upwardly through the space between these funnels. In the preferred embodiment, the spacer 47 has a ring portion that closely encircles the funnel 35 and three short outwardly pointing rods, spaced equidistant around the ring portion, that rest against the funnel 27. The funnel 27 includes a lower extension collar 48 extending downwardly from the bottom 49 of the funnel and fits into the interior of the gas discharge tube 26. Also shown in FIG. 4, the collar 23 may be beveled on its inside diameter to help prevent liquid coolant from splashing outwardly therefrom. The collar 23 may also provide space between the cover 16 and the screen 45 to permit gaseous or liquid coolant that escapes from the outlet port to be drawn back into the inlet port.

As can be seen from the cross-sectional view of FIG. 4, the horizontal spacing between the funnels 35 and 27 is relatively constant from the bottom 49 of the funnel 27 to its top opening 42, but the total horizontal area between the two funnels increases steadily from the bottom to the top of the funnel. Thus, if any liquid coolant does pass up through the gas discharge tube into the space between the two funnels, it will rise up vertically at a slower rate than in the gas discharge tube since much more volume must be filled by the liquid. This effect reduces the likelihood of an accidental spill since the operator will observe the inlet funnel 35 filling up and not discharging and will stop pouring coolant into the inlet.

Exemplary dimensions for the tubes 26 and 32 formed of PTFE are: discharge tube 26, 0.60 inch inside diameter, 0.63 inch outside diameter; delivery tube 32, 0.150 inch inside diameter, 0.170 inch outside diameter (approximately 0.011 to 0.019 inch wall thickness); diameter of top 36 of inlet funnel 35, 2.5 inches, height of funnel, about 3 inches. The length of the tubes 26 and 32 will be determined by the positioning of the dewar in the instrument cabinet.

The present invention is particularly adapted to filling detectors that are used with infrared spectrometers, such as is shown in the above-mentioned U.S. Pat. No. 4,740,702. A simplified cross-sectional view of such a detector 13, as shown in FIG. 4, has an outer vessel 28 defining the outer boundary of the dewar, and an inner vessel 51 which contains the liquid coolant 52. A detector (not shown in FIG. 4) is in thermal communication with the inner vessel 51 and receives infrared radiation through an infrared transmissive window (not shown in FIG. 4). The inner vessel 51 is connected to the outer vessel 28 by a suspending tube 56 which extends from the top of the inner vessel 51 to the fill port 30 of the detector. The outer gas discharge tube 26 is connected to the detector 13 by a hollow connecting fitting 58 which, in the preferred embodiment, is made of nylon. One end of the fitting 58 has raised circumferential ribs 60 that squeeze against the interior of the bottom of the tube 26 and provide a seal therebetween. In the preferred embodiment, the other end of the fitting 58 threads into a pre-threaded nut 61 which, in the preferred embodiment, is welded to the top of the dewar outer vessel 28. The weld on the nut completely encircles the fill port 30 at the top of the detector 13 and provides a leak-proof seal between the nut and the dewar outer vessel 28. The nut allows the fitting 58 to be firmly anchored to the detector 13 and, with the fitting 58 screwed into it, provides a leak-proof seal between the detector 13 and the discharge tube 26. An additional advantage of this secure connection is that it will sustain the backflow pressure created by evaporating liquid coolant. In the preferred embodiment, the threads and raised ribs of the fitting 58 are wound with Teflon tape prior to assembly to further prevent leaks. When the hollow fitting 58 is in place, its central hole allows the interior of the tube 26 to communicate with the interior of the vessel 51.

In an alternate embodiment of the present invention, shown in the figures, the hollow connecting fitting 58 may be threaded directly into the interior bore of the suspending tube 56 at the fill port 30. If the interior bore of the suspending tube 56 is not pre-threaded, only a friction seal is created by the Teflon tape and the threads of the fitting 58. In some instances, the interior bore of the suspending tube 56 could be pre-threaded to simplify construction and provide a stronger connection. In any of the embodiments, the fitting 58 may also include an integrally formed hexagonal portion 57 to allow the fitting to be tightened down with a standard wrench, not shown.

The tube 32 extends down through the fitting 58 and the tube 56 to a position at which the lower end 59 of the delivery tube is within the interior space of the inner vessel 51. The diameter of the tube 59 is smaller than the interior diameter of the suspending tube 56 so that evaporating coolant gas can freely flow up through the tube 56 into the gas discharge tube 26. Because the cross-sectional area of the interior of the delivery tube 32 is preferably substantially smaller than the cross-sectional area between the delivery tube 32 and the interior walls of the tube 56, any liquid bubbling up from the interior of the inner vessel 51 will more freely flow up through the gas discharge tube 26 rather than through the delivery tube, thereby minimizing the likelihood of back flows through the delivery tube. Evaporation of the liquid coolant, such as liquid nitrogen, which flows up as a cool gas through the space between the tubes 26 and 32 will tend to maintain the tube 32 at a temperature substantially below atmospheric temperature, thereby minimizing the heating of the coolant gas as it is delivered to the detector. Because the heating of the liquid is minimized, the likelihood of evaporation in the delivery tube which can lead to backflows is also minimized.

The funnels 27 and 35 are preferably formed of tough and durable plastic materials such as appropriate grades of polyethylene or PTFE, and the inner funnel 35 is preferably somewhat transparent or translucent so that an operator can determine if the dewar has been so overfilled that liquid has filled up the entire discharge tube 26 and is backing up into the space between the funnels. Alternatively, if the materials used are opaque, the operator can determine if liquid coolant has risen into the space between the two funnels by noting that coolant will remain in the inner funner 35 and not drain down.

It is understood that the invention is not confined to the particular embodiments set forth herein but embraces all such modified forms thereof as come within the scope of the following claims.

What is claimed is:

1. Filler apparatus for delivery of liquid coolant to a liquid cooled radiation detector from a position remote from the detector comprising:
   (a) a liquid coolant inlet port;
   (b) a gas outlet port adjacent to coaxial with, and spaced outwardly from the liquid inlet port;
   (c) a liquid delivery tube extending downwardly from the inlet port to a lower end in the detector; and
   (d) a gas discharge tube coaxial with and spaced outwardly from the delivery tube extending from the detector to the gas outlet port to convey the gas from evaporated liquid coolant in the detector to the outlet port.

2. The apparatus of claim 1 wherein the liquid inlet port includes a funnel extending to the liquid delivery tube to funnel liquid into the tube and wherein the gas outlet port includes a funnel coaxial with, surrounding and spaced outwardly from the funnel of the inlet port, the outlet port funnel extending to the gas discharge tube.

3. The apparatus of claim 2 including a screen extending across the top openings of the inlet port funnel and the outlet port funnel.

4. The apparatus of claim 3 wherein the screen is formed of a mesh of polyethylene.

5. The apparatus of claim 2 including a cover hingedly mounted to close across the top openings of the inlet port funnel and the outlet port funnel.

6. The apparatus of claim 1 including a cover mounted to close to cover the inlet and outlet ports.

7. The apparatus of claim 1 wherein the discharge tube is formed of a clear plastic through which any overflowing coolant liquid reaching the discharge tube can be seen by an operator.

8. The apparatus of claim 2 wherein the inlet port funnel is formed of a clear plastic through which any liquid coolant which has reached the area between the two funnels can be seen by the operator.

9. The apparatus of claim 1 wherein the gas discharge tube is formed of polytetrafluoroethylene plastic.

10. The apparatus of claim 1 wherein the detector has an inner vessel for containing liquid coolant and the liquid delivery tube extends into the interior of the inner vessel in the detector and below a position at which the gas discharge tube meets the detector.

11. Filler apparatus for a vessel which contains cryogenic liquid coolant, comprising:
   (a) an inlet port having a funnel extending from a top opening to a bottom;
   (b) a gas outlet port including a funnel mounted co-axial with, surrounding and spaced outwardly from the funnel of the inlet port, the gas outlet port funnel having an open top and extending to a bottom;
   (c) a liquid delivery tube extending from the bottom of the inlet port funnel to an opening where it can deliver cryogenic liquid coolant to the coolant containment vessel; and
   (d) a gas discharge tube co-axial with and spaced outwardly from the liquid delivery tube and extending from the bottom of the gas outlet port funnel to the detector to direct gas resulting from evaporation of liquid coolant in the coolant containment vessel to the gas outlet port where it can be discharged.

12. The apparatus of claim 11 including a screen extending across the top openings of the inlet port funnel and the outlet port funnel.

13. The apparatus of claim 12 wherein the screen is formed of a mesh of polyethylene.

14. The apparatus of claim 11 including a cover hingedly mounted to close across the top openings of the inlet port funnel and the outlet port funnel.

15. The apparatus of claim 11 wherein the discharge tube is formed of a clear plastic through which any overflowing coolant liquid reaching the discharge tube can be seen by an operator.

16. The apparatus of claim 11 wherein the inlet port funnel is formed of a clear plastic through which any liquid coolant which has reached the area between the two funnels can be seen by the operator.

17. The apparatus of claim 11 wherein the gas discharge tube is formed of polytetrafluoroethylene plastic.

18. The apparatus of claim 11 wherein the liquid delivery tube extends into the interior of the inner vessel containing the liquid coolant and below a position at which the gas discharge tube meets the vessel.

19. Radiation detection apparatus for an FTIR spectrometer which is capable of receiving liquid coolant, comprising:
   (a) a detector having inner and outer vessels connected together to define a dewar, the inner vessel adapted to contain liquid coolant, the detector having a fill port extending from an outer surface of the detector to the interior of the inner vessel by which liquid coolant can be introduced into the inner vessel;
   (b) a liquid coolant inlet port including a funnel having a top opening and extending to a bottom;
   (c) a gas discharge port including a funnel co-axial with, surrounding and spaced outwardly from the funnel of the liquid inlet port and extending from a top opening at substantially the same level as the top opening of the inlet port funnel to a bottom;
   (d) a liquid delivery tube extending from the bottom of the inlet port funnel and into the inner vessel of the detector to deliver liquid coolant from the inlet port funnel to the interior of the inner vessel of the detector;
   (e) a gas discharge tube co-axial with and spaced outwardly from the delivery tube and extending from connection with the detector at the fill port of the detector to the bottom of the gas outlet port funnel to direct gas resulting from evaporation of the liquid coolant in the inner vessel to the gas outlet port.

20. The apparatus of claim 19 including a screen extending across the top openings of the inlet port funnel and the outlet port funnel.

21. The apparatus of claim 19 wherein the screen is formed of a mesh of polyethylene.

22. The apparatus of claim 19 including a cover hingedly mounted to close across the top openings of the inlet port funnel and the outlet port funnel.

23. The apparatus of claim 19 wherein the discharge tube is formed of a clear plastic through which any overflowing coolant liquid reaching the discharge tube can be seen by an operator.

24. The apparatus of claim 19 wherein the inlet port funnel is formed of a clear plastic through which any liquid coolant which has reached the area between the two funnels can be seen by the operator.

25. The apparatus of claim 19 wherein the gas discharge tube is formed of polytetrafluoroethylene plastic.

26. The apparatus of claim 19 wherein the liquid delivery tube extends into the interior of the inner vessel containing the liquid coolant in the detector and below a position at which the gas discharge tube is connected to the detector.

* * * * *